United States Patent
Kato et al.

(10) Patent No.: US 10,207,872 B2
(45) Date of Patent: Feb. 19, 2019

(54) WORKPIECE CONVEYOR SYSTEM

(71) Applicant: FANUC CORPORATION, Minamitsuru-gun, Yamanashi (JP)

(72) Inventors: Yoshiaki Kato, Yamanashi (JP); Masaru Oda, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 14/676,347

(22) Filed: Apr. 1, 2015

(65) Prior Publication Data

US 2015/0284184 A1    Oct. 8, 2015

(30) Foreign Application Priority Data

Apr. 3, 2014 (JP) ................................. 2014-077122

(51) Int. Cl.

| | | |
|---|---|---|
| *B21C 47/24* | (2006.01) | |
| *B65G 15/28* | (2006.01) | |
| *B65G 47/90* | (2006.01) | |
| *B65G 47/88* | (2006.01) | |
| *B65G 47/91* | (2006.01) | |

(52) U.S. Cl.
CPC ........... *B65G 15/28* (2013.01); *B65G 47/883* (2013.01); *B65G 47/90* (2013.01); *B65G 47/91* (2013.01); *B65G 2203/0233* (2013.01)

(58) Field of Classification Search
CPC .................................................... B21C 47/24
USPC ......................................... 414/546, 547, 567
See application file for complete search history.

(56) References Cited

U.S. PATENT DOCUMENTS

| | | | | |
|---|---|---|---|---|
| 6,311,830 B1* | 11/2001 | Grimm | ................... | B23Q 7/035 198/477.1 |
| 6,711,882 B1* | 3/2004 | Schneider | ............... | B31B 19/98 53/241 |
| 2010/0193326 A1* | 8/2010 | Mougin | ................. | B65G 47/82 198/426 |
| 2014/0017048 A1* | 1/2014 | Mattern | ................. | B25J 9/1612 414/567 |

FOREIGN PATENT DOCUMENTS

| | | |
|---|---|---|
| CN | 201587712 U | 9/2010 |
| CN | 202379462 U | 8/2012 |
| JP | S57098419 A | 6/1982 |
| JP | 58224910 A | 12/1983 |
| JP | 60099827 A | 6/1985 |

(Continued)

OTHER PUBLICATIONS

Japanese Office Action with English language translation for Application No. 2014-077122, dated Jan. 17, 2017, 16 pages.

*Primary Examiner* — Saul Rodriguez
*Assistant Examiner* — Willie Berry, Jr.
(74) *Attorney, Agent, or Firm* — RatnerPrestia

(57) ABSTRACT

A workpiece conveyor system comprising: a conveyance apparatus which conveys workpieces in one direction, a stopper which is mounted on the conveyance apparatus so as to stop workpieces which are conveyed by the conveyance apparatus at a predetermined position, and a takeout apparatus which takes out workpieces which have been stopped by the stopper from the conveyance apparatus. An outer edge of the stopper in an opposite direction to a conveyance direction of workpieces extends in a curved shape in a transverse direction of the conveyance apparatus.

3 Claims, 6 Drawing Sheets

(56) References Cited

FOREIGN PATENT DOCUMENTS

| | | |
|---|---|---|
| JP | 64005742 A | 1/1989 |
| JP | 02225206 A | 9/1990 |
| JP | H05005732 U | 1/1993 |
| JP | 05286544 | 11/1993 |
| JP | 06031547 A | 2/1994 |
| JP | H06312830 A | 11/1994 |
| JP | 08091549 A | 4/1996 |

* cited by examiner

WORKPIECE CONVEYOR SYSTEM

BACKGROUND OF THE INVENTION

1. Field of the Invention

The present invention relates to a workpiece conveyor system comprising a conveyance apparatus for conveying workpieces in one direction, and a takeout apparatus for taking out workpieces which are conveyed by the conveyance apparatus.

2. Description of the Related Art

Various workpiece conveyor systems are known in the art, and these systems comprise belt conveyors or other conveyance apparatuses for conveying pluralities of workpieces, and robots or other takeout apparatuses for taking out workpieces conveyed by the conveyance apparatuses one piece at a time. In relation to this, JP-A-H05-286544 proposes a positioning system for a robot palletizer comprising a plurality of motor conveyors which convey workpieces in a predetermined conveyance direction, guide members which restrict positions of the workpieces in a lateral direction intersecting the conveyance direction, and a stopper member which stops workpieces which are conveyed along the guide members. Further, the positioning system of JP-A-H05-286544 stops the workpieces conveyed along the guide members by striking the workpieces against a flat abutting surface of a stopper member. In this regard, when a stopper member with such a flat abutting surface is used, depending on the shapes of the workpieces, the lateral faces of the workpieces are liable to come into close contact with the abutting surface of the stopper member, or the lateral faces of adjoining workpieces are liable to come into close contact with each other.

FIG. 7 is a perspective view which shows one example of a conventional conveyance apparatus which, like the positioning system of JP-A-H05-286544, comprises a stopper member which stops workpieces at a flat abutting surface. As shown in FIG. 7, the conveyance apparatus 7 of this example comprises a belt conveyor 71 which conveys a plurality of workpieces W in the direction shown by the arrow A70, and a stopper member 72 which stops workpieces W which have been conveyed up to a predetermined position at the flat abutting surface AS. Further, the workpieces W to be conveyed by the conveyance apparatus 7 of this example have triangular prism shapes and are placed on the belt conveyor 61 in the state with their bottom faces facing downward. As will be understood from FIG. 7, when workpieces W with flat lateral faces are stopped by a flat abutting surface AS, the lateral faces of the workpieces W are liable to come into close contact with the abutting surface AS, or the lateral faces of the adjoining workpieces W are liable to come into close contact with each other. As a result, the robot or other takeout apparatus is liable to grip not only a target workpiece W to be taken out but also its adjoining workpiece W, and is liable to drop the adjoining workpiece W while taking out these workpieces W.

A workpiece conveyor system which can take out workpieces stopped by a stopper one at a time in a reliable manner is therefore being sought.

SUMMARY OF THE INVENTION

According to a first aspect of the present invention, there is provided a workpiece conveyor system, comprising: a conveyance apparatus which conveys workpieces in one direction, a stopper which is mounted on the conveyance apparatus so as to stop workpieces which are conveyed by the conveyance apparatus at a predetermined position, and a takeout apparatus which takes out workpieces which have been stopped by the stopper from the conveyance apparatus, wherein, an outer edge of the stopper in an opposite direction to a conveyance direction of workpieces by the conveyance apparatus extends in a curved shape in a transverse direction of the conveyance apparatus.

According to a second aspect of the present invention, there is provided a workpiece conveyor system in the first aspect, wherein the outer edge of the stopper has a recessed part which is recessed in the same direction as the conveyance direction.

According to a third aspect of the present invention, there is provided a workpiece conveyor system in the first or second aspect, further comprising a position sensor which detects positions of workpieces which have been stopped by the stopper, and the takeout apparatus is a vertical articulated robot which has a hand which grips a workpiece, and an arm which moves the hand to a position where the hand can grip a workpiece based on results of detection of the position sensor.

These and other objects, features, and advantages of the present invention will become clearer with reference to the detailed description of illustrative embodiments of the present invention which are shown in the attached drawings.

DETAILED DESCRIPTION OF EMBODIMENTS

Below, embodiments of the present invention will be explained in detail with reference to the drawings. Note that the following explanation does not limit the technical scope of the inventions which are described in the claims or the meaning of terms etc.

Figure 1:
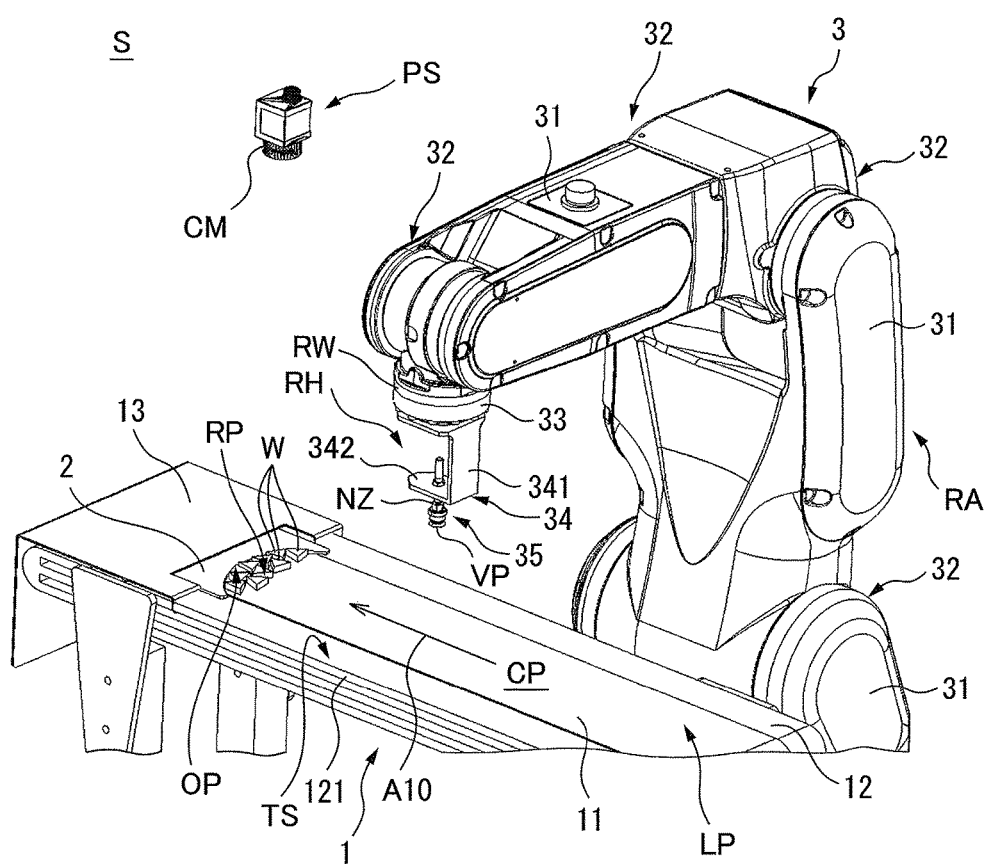
FIG. 1 is a perspective view of a typical workpiece conveyor system of an embodiment of the present invention.

Referring to FIG. 1 to FIG. 6, a workpiece conveyor system of one embodiment of the present invention will be explained. FIG. 1 is a perspective view of a typical workpiece conveyor system of the present embodiment. Here, the workpiece conveyor system S of this example is an interprocess conveyor system for conveying workpieces which have been loaded at a predetermined loading position to a predetermined takeout position, taking out the workpieces which have been conveyed to the takeout position, and then conveying them to the next process. The operation of such a workpiece conveyor system S will be referred to below as a "workpiece conveyance operation". As shown in FIG. 1, the workpiece conveyor system S of the present example comprises a conveyance apparatus 1 which conveys workpieces W in one direction, a stopper 2 which is mounted on the conveyance apparatus 1 so as to stop workpieces W which have been conveyed by the conveyance apparatus 1 at a takeout position RP, and a takeout apparatus 3 which takes out the workpieces W which have been stopped by the stopper 2 from the conveyance apparatus 1 one by one. These apparatuses will be explained blow in order.

First, the conveyance apparatus 1 of the present example will be explained. As shown in FIG. 1, the conveyance apparatus 1 of this example is a general belt conveyor which comprises an endless belt 11 which is stretched across a plurality of pulleys (not shown), a frame 12 which supports the inner circumferential surface of the belt 11 so that the belt 11 runs along a predetermined route, and a servo motor or other driving means (not shown) for driving the belt 11 by rotating the pulleys of the belt 11. Further, the frame 12 of the present example has a flat plate shaped frame body 121 which extends in one direction. The conveyance apparatus 1 of the present example conveys the workpieces W by the belt 11 which runs along the top surface TS of the frame body 121. Note that, in the conveyance apparatus 1 of the present example, the top surface TS of the frame body 121 extends in parallel with the horizontal direction.

The arrow mark A10 of FIG. 1 expresses the direction of movement of the belt 11 which runs along the top surface TS of the frame body 121, that is, the conveyance direction of the workpieces W by the conveyance apparatus 1. Further, in the following explanation, the part of the outer circumferential surface of the belt 11 which extends along the top surface TS of the frame body 121 will sometimes be particularly referred to as the "conveyance path CP of the workpieces W". As will be understood from FIG. 1, the loading position LP where the workpieces W are loaded on the conveyance apparatus 1 of the present example is provided at the end part of the conveyance path CP in the opposite direction to the conveyance direction which is expressed by the arrow mark A10, while the takeout position RP where the workpieces W are taken out from the conveyance apparatus 1 is provided at a position spaced by a predetermined distance from the loading position LP along the conveyance direction which is expressed by the arrow mark A10, Next, the stopper 2 of the present example will be explained. As shown in FIG. 1, the stopper 2 of the present example has a flat plate shape which extends in parallel with the frame body 121, and is attached to the frame 12 through the intermediary of an insert type mounting member 13. The mounting member 13 of the present example is mounted on the end part of the frame 12 in the conveyance direction of the workpieces W. The stopper 2 inserted into the mounting member 13 is designed to be located adjoining the takeout position RP on the conveyance path CP. Further, the stopper 2 of the present example extends across the entire length of the width direction of the belt 11 so as to close off the conveyance path CP at the downstream side of the takeout position RP. Therefore, workpieces W are stopped at the takeout position RP by abutting against the stopper 2 while being conveyed along the conveyance path CP. The detailed structure of the stopper 2 of the present example will be explained later.

Next, the position sensor PS of the present example will be explained. The position sensor PS of the present example is a general vision sensor which comprises a camera CM which captures an image of the takeout position RP and its vicinity on the conveyance path CP of the workpieces W, and an image processing apparatus (not shown) which detects the positions of the individual workpieces W which are included in the captured image of the camera CM. The position sensor PS of the present example is mounted at a position spaced by a predetermined distance from the top surface TS of the frame body 121 by a mounting member (not shown). The results of detection of the positions of the workpieces W by the position sensor PS are transmitted to a robot arm A of the takeout apparatus 3, which is explained later.

Next, the takeout apparatus 3 of the present example will be explained. As shown in FIG. 1, the takeout apparatus 3 of the present example is a vertical articulated robot comprising a robot arm RA which has a wrist part RW at its front end, and a robot hand RH which is attached to the wrist part RW. Here, the robot arm A of the present example has a structure comprising a plurality of arm parts 31 which are connected in series through the intermediary of rotary type articulated parts 32. These arm parts 31 are driven by servo motors or other drive means to freely change the position and posture of the robot hand RH. In particular, the robot arm A of the present example moves the robot hand RH to a position where the robot hand RH can grip a workpiece W, based on the results of detection of position of a workpiece W which is received from a position sensor PS. The principle by which the robot hand RH grips a workpiece W will be explained later.

As shown in FIG. 1, the robot hand RH of this example has a base part 33 which is rotatably attached to a wrist part RW of the robot arm A, a body part 34 which extends from the base part 33, and a suction part 35 which is attached to the body part 34. More specifically, the body part 34 of the robot hand RH has a projecting part 341 which projects from the base part 33 to the opposite side of the wrist part RW, and a vertical part 342 which extends from the front end of the projecting part 341 in a vertical direction to the projecting part 341. Further, the suction part 35 of the robot hand RH has a nozzle NZ which can fit into a through hole formed on the vertical part 342 of the body part 34, and a vacuum pad VP which is attached to the front end of the nozzle NZ. The base end of the nozzle NZ is connected through the intermediary of an air tube (not shown) to a vacuum pump or other vacuum source. Therefore, in the workpiece conveyor system S of the present example, when the vacuum pad VP is kept in contact with a workpiece W and the gas inside the vacuum pad VP is evacuated by the vacuum source, the workpiece W is absorbed by the vacuum pad VP by the action of the negative pressure which is formed within the vacuum pad VP.

Figure 2:
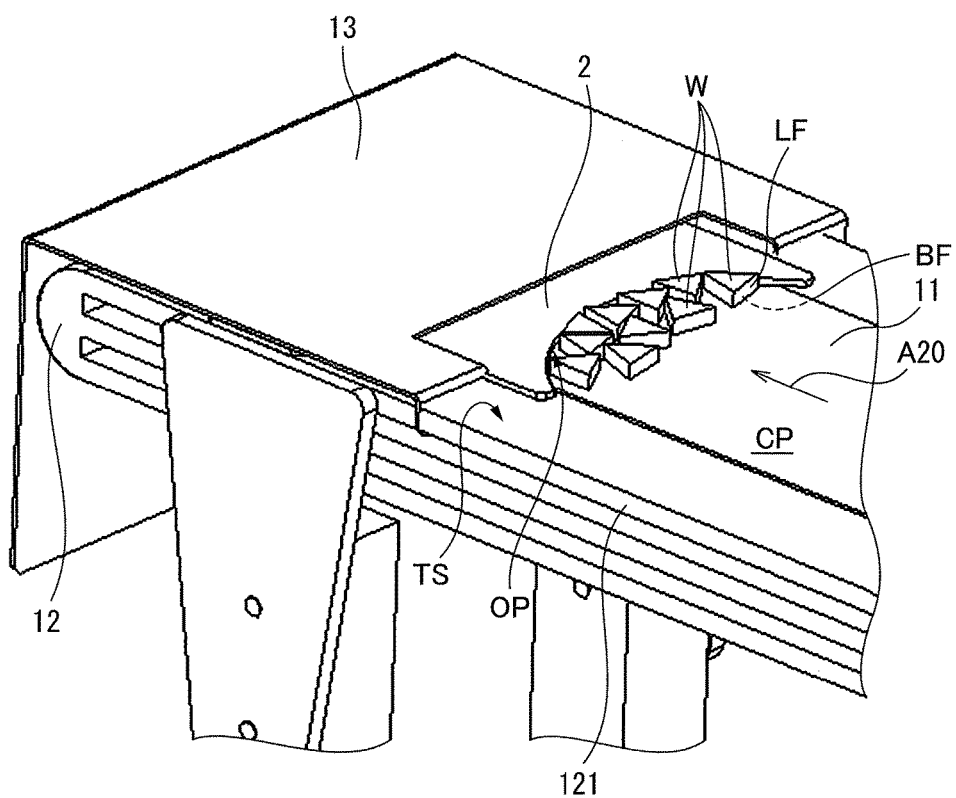
FIG. 2 is a partial enlarged view which shows the stopper and its vicinity in the workpiece conveyor system of FIG. 1.

As explained above, in the workpiece conveyor system S of the present example, the robot arm A and the robot hand RH of the takeout apparatus 3 cooperate to grip the individual workpieces W which have been stopped by the stopper 2, and to take out the gripped workpieces W from the conveyance apparatus 1 and then convey it to a predetermined unloading region. Next, the workpieces W to be conveyed by the workpiece conveyor system S of the present example will be explained. FIG. 2 is a partial enlarged view which shows the stopper 2 and its vicinity in the workpiece conveyor system S of FIG. 1. A workpiece W in the present example has a columnar shape including a flat bottom face BF and at least one flat lateral face LF which intersects the bottom face BF. Further, a workpiece W of the present example is conveyed with the bottom face BF placed on the conveyance path CP so as to face the outer circumferential surface of the belt 11. Therefore, the contour of a workpiece W on the conveyance path CP as viewed from above in the vertical direction includes at least one straight part. The workpiece W illustrated in FIG. 2 has a triangular prism shape including a bottom face BF and three intersecting lateral faces LF at its outer periphery.

Figure 3:
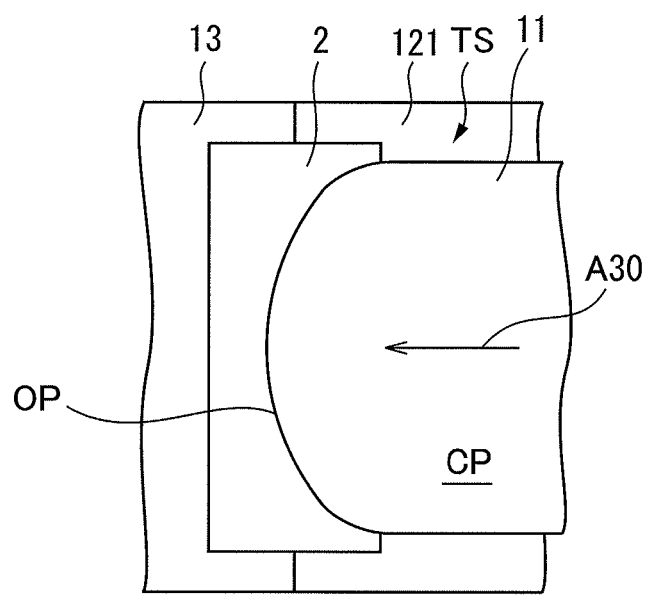
FIG. 3 is a top view of the stopper in the workpiece conveyor system of FIG. 1 when viewing the stopper in the direction vertical to the top surface of a frame body.

Next, referring to FIG. 1 and FIG. 2, the detailed structure of the stopper 2 of the present example will be explained. As shown in FIG. 1 and FIG. 2, the outer edge OP of the stopper 2 in the opposite direction to the conveyance direction of the workpiece W is formed into a curved shape which extends in a transverse direction of the conveyance path CP. FIG. 3 is a top view of the stopper 2 at the workpiece conveyor system S of FIG. 1 as viewed in a direction vertical to the top surface TS of the frame body 121. As will be understood from FIG. 3, the outer edge OP of the stopper 2 in the opposite direction to the conveyance direction which is expressed by the arrow mark A30 forms a curved shape which extends in a transverse direction of the conveyance path CP. According to such structure of a stopper 2, workpieces W under conveyance along the conveyance direction are stopped at the curved outer edge OP which extends in a transverse direction of the conveyance path CP. Therefore, according to the structure of the stopper 2 of this example, the straight parts included in the contours of the above-mentioned workpieces W never overlap the outer edge OP of the stopper 2, and therefore it is possible to prevent the stopped workpieces W from coming into close contact with the stopper 2.

Furthermore, according to the structure of the stopper 2 of this example, the stopped workpieces W are arranged in a curved line along the outer edge OP. Therefore, according to the structure of the stopper 2 of this example, the straight parts included in the contours of the adjoining workpieces W are less likely to overlap, and therefore these workpieces W are less likely to come into close contact with each other. In the above way, according to the structure of the stopper 2 of this example, it is possible to prevent a large friction force from acting between a workpiece W to be taken out and the stopper 2, and also to prevent a workpiece W from being caught on the stopper 2 or its adjoining workpiece W while being taken out. Therefore it is possible to take out the stopped workpieces W one at a time in a reliable manner.

Figure 4:
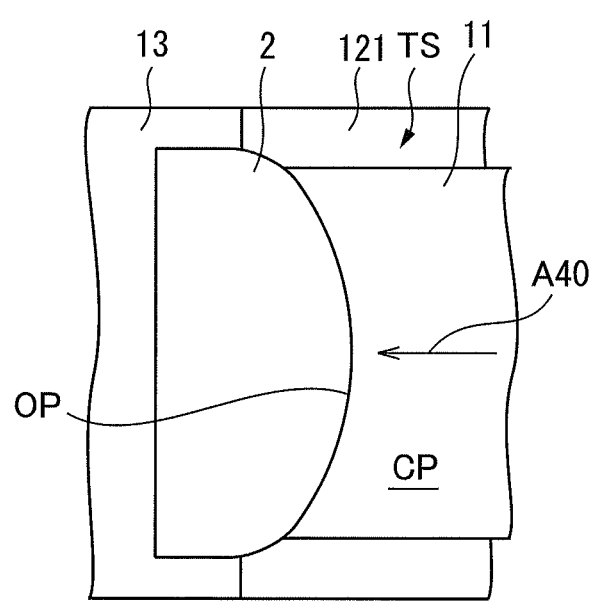
FIG. 4 is a top view similar to FIG. 3 and shows a first modification of the stopper in the workpiece conveyor system of the present embodiment.
Figure 5:
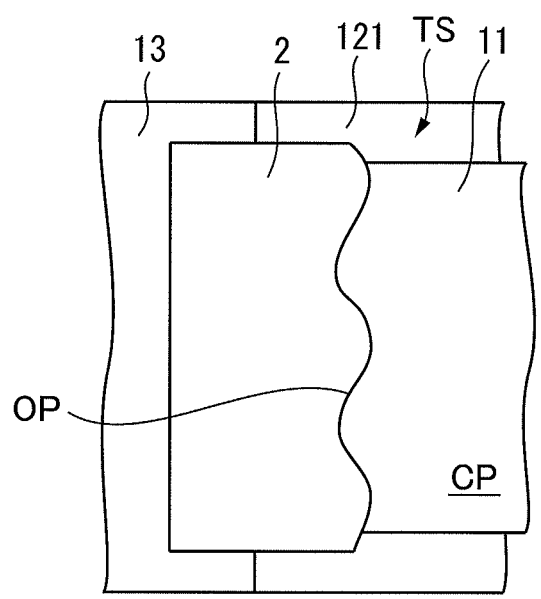
FIG. 5 is a top view similar to FIG. 3 and shows a second modification of the stopper in the workpiece conveyor system of the present embodiment.

Further, as will be understood from FIG. 3, the outer edge OP of the stopper 2 of the present example has a recessed part which is recessed in the same direction as the conveyance direction which is expressed by the arrow mark A30. Due to this, the stopped workpieces W are likely to collect at the inside of the recessed part, and therefore even if the range of operation of the takeout apparatus 3 is relatively small, the workpieces W can be reliably taken out in a reliable manner. Note that, the curved shape of the outer edge OP of the stopper 2 is not limited to the one which is illustrated in FIG. 3. Various curved shapes can be selected corresponding to the dimensions and shapes of the workpieces W and to the range of operation of the takeout apparatus 3 etc. FIG. 4 and FIG. 5 are both top views similar to FIG. 3 and show first and second modifications of the stopper 2 in the workpiece conveyor system of the present embodiments.

As shown in FIG. 4, the outer edge OP of the stopper 2 according to the first modification has a projecting part which projects out in the opposite direction to the conveyance direction which is expressed by the arrow mark A40. Further, as shown in FIG. 5, the outer edge OP of the stopper 2 according to the second modification has a wave-shaped part which extends in a wave shape across the conveyance path CP. In these modifications as well, the straight parts included in the contours of the workpieces W never overlap the outer edge OP of the stopper 2, and therefore it is possible to prevent the stopped workpieces W from coming into close contact with the stopper 2. Furthermore, in these modifications as well, the stopped workpieces W are arranged in a curved line along the outer edge OP, and therefore these workpieces W are less likely to come into close contact with each other.

Figure 6:
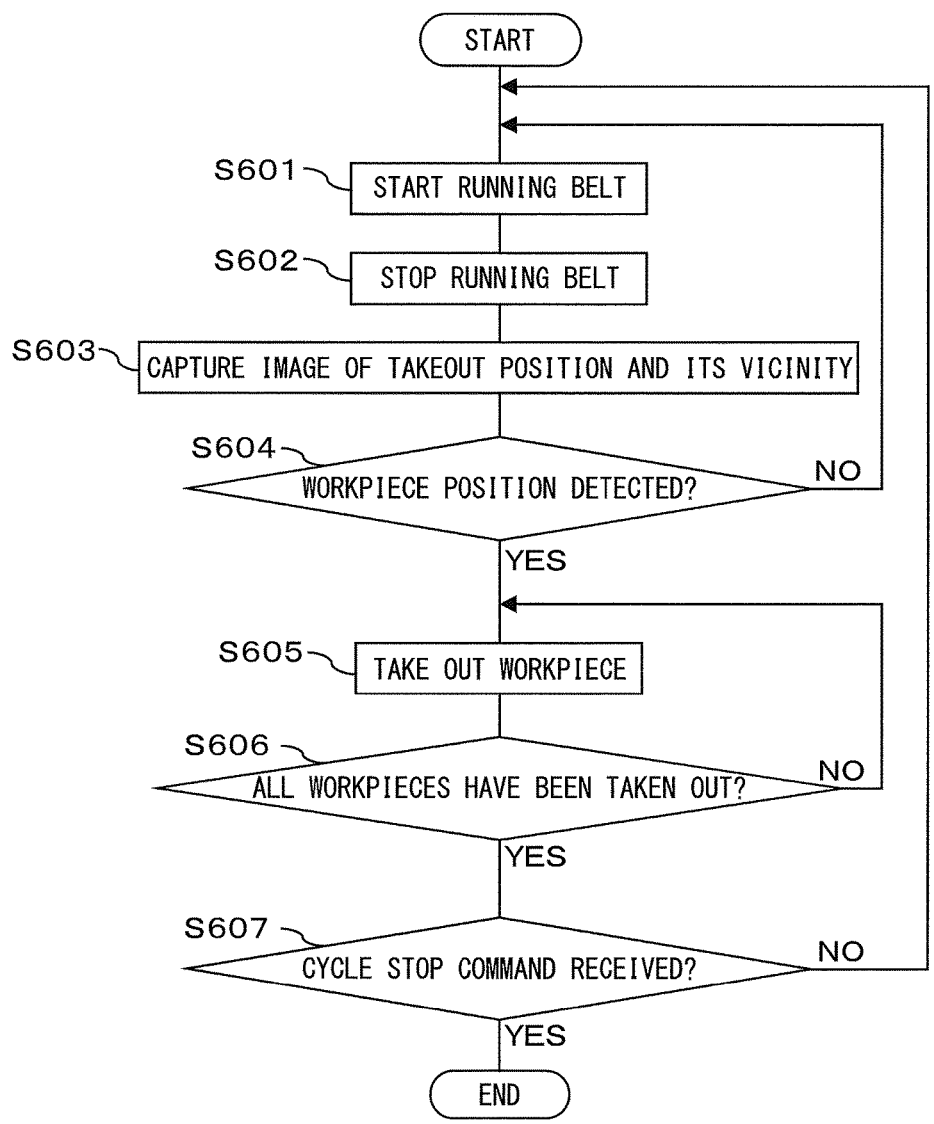
FIG. 6 is a flow chart which shows steps of a typical workpiece conveyance process according to the workpiece conveyor system of the present embodiment.
Figure 7:
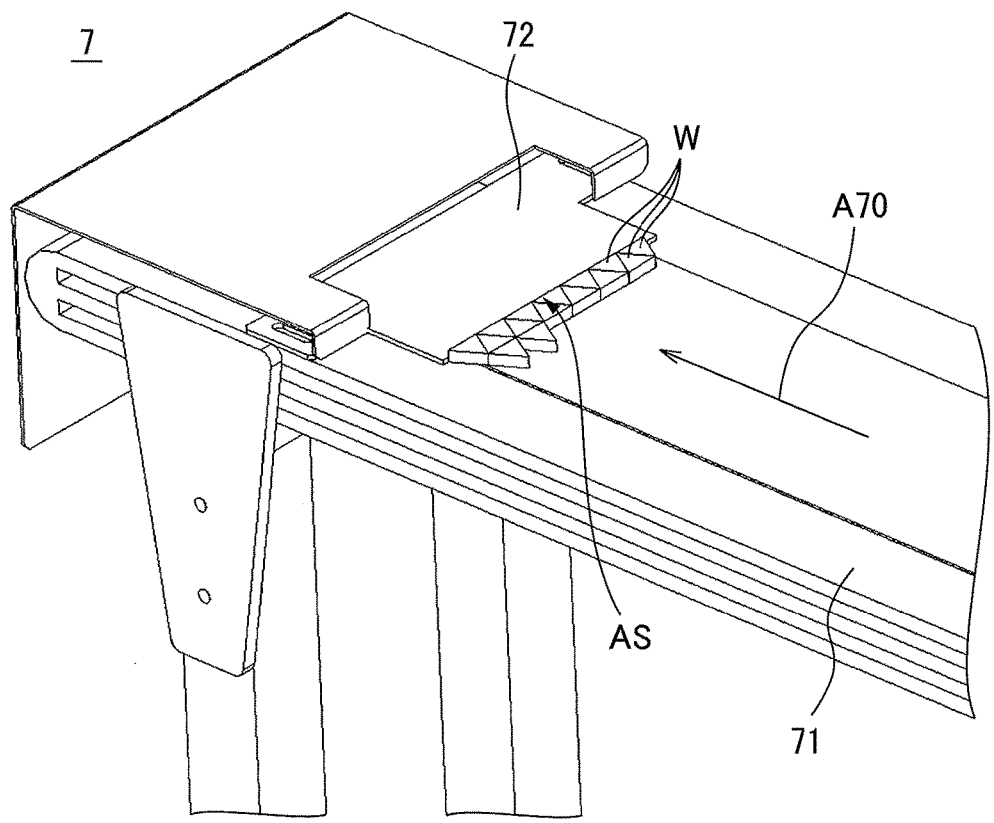
FIG. 7 is, a perspective view which shows one example of a conventional conveyance apparatus comprising a stopper member which stops workpieces at its flat abutting surface in the same way as the positioning system of JP-A-H05-286544.

Next, the workpiece conveyance operation according to the workpiece conveyor system of the present embodiments will be explained. FIG. 6 is a flow chart which shows steps of an illustrative workpiece conveyance operation by a workpiece conveyor system S of the present embodiment. As shown in FIG. 6, first, at step S601, the conveyance apparatus 1 starts running the belt 11. As a result of this step, the workpieces W on the belt 11 are conveyed along the conveyance direction until they strike the outer edge OP of the stopper 2 (see FIG. 2). Next, at step S602, the conveyance apparatus 1 stops running the belt 11 when the belt 11 has been moved by a predetermined distance along the conveyance direction. Next, at step S603, the camera CM of the position sensor PS captures an image of the takeout position RP and its vicinity on the conveyance path CP, and an image processing apparatus of the position sensor PS detects the positions of individual workpieces W which are included in that camera image.

Next, at step S604, the workpiece conveyance operation branches depending on whether the position of a workpiece W was detected at step S603. If the position of a workpiece W was not detected at step S603 (step S604, NO), that is, if there is no workpiece W at the takeout position RP, the workpiece conveyor system S returns to the above step S601. On the other hand, if the position of a workpiece W is detected at step S603 (step S604, YES), that is, if there is a workpiece W at the takeout position RP, the workpiece conveyor system S proceeds to the following step S605. Next, at step S605, the takeout apparatus 3 drives the robot arm RA and the robot hand RH to take out the workpieces W from the conveyance apparatus 1 one at a time. During this step, the robot arm A moves the robot hand RH to a position where the robot hand RH can grip the workpiece W based on the results of detection of position of the workpiece W by the position sensor PS.

Next, at step S606, the workpiece conveyance operation branches depending on whether all workpieces W detected at step S603 have already been taken out. Here, if all workpieces W detected at step S603 have not been taken out yet (step S606, NO), that is, if there remains a workpiece W at the takeout position RP, the workpiece conveyor system S returns to the above step S605. On the other hand, if all workpieces W detected at step S603 have already being taken out (step S606, YES), that is, if there remains no workpiece W at the takeout position RP, the workpiece conveyor system S proceeds to the following step S607.

Next, at step S607, the workpiece conveyance operation branches depending on whether the workpiece conveyor system S has received a cycle stop command. A cycle stop command according to the present example is input by a user via a keyboard, touch panel, or other input device which is installed on the workpiece conveyor system S. However, it is also possible to automatically generate a cycle stop command at the point of time when a predetermined time has elapsed since the workpiece conveyance operation was started or at the point of time when the step of taking out a workpiece W (see step S605) has been repeated a predetermined number of times. Further, when a cycle stop command has been received (step S607, YES), the workpiece conveyor system S ends the workpiece conveyance operation. When a cycle stop command has not been received (step S607, NO), the workpiece conveyor system S returns to step S601.

Note that, at step S601, the workpieces W conveyed by the conveyance apparatus 1 are stopped at the outer edge OP of the stopper 2 which extends in a curved shape in the transverse direction of the conveyance path CP, and therefore the workpieces W will never come into close contact with the stopper 2. Furthermore, the workpieces W stopped by the stopper 2 are arranged in a curved line along the outer edge OP of the stopper 2, and therefore these workpieces W are less likely to come into close contact with each other. Therefore, at step S605, it is possible to prevent a large friction force from acting between a workpiece W to be taken out and the stopper 2, and also to prevent a workpiece W from being caught on the stopper 2 or its adjoining workpiece W while being taken out. It is thus possible to take out the stopped workpieces one at a time in a reliable manner.

Further, at step S605, the robot arm RA of the takeout apparatus 3 moves the robot hand RH to a position where the robot hand RH can grip a workpiece W, based on the positions of the individual workpieces W which were detected by the position sensor PS. This ensures that the robot hand RH is accurately positioned with respect to the individual workpieces W, and therefore even if the stopped workpieces W are spread over a broad range of the conveyance path CP, it is possible to take out these workpieces W one by one in a reliable manner. Note that, according to the structure of the above-mentioned stopper 2, the adjoining workpieces W are less likely to come into close contact with each other, and therefore it is possible to improve detection accuracy when the position sensor PS detects individual workpieces W.

EFFECT OF INVENTION

According to the first aspect of the present invention, workpieces conveyed by a conveyance apparatus are stopped at an outer edge of a stopper which extends in a curved shape in a transverse direction of the conveyance apparatus, and therefore it is possible to prevent these workpieces from coming into close contact with the stopper. Furthermore, according to the first aspect, the workpieces stopped by the stopper are arranged in a curved line along the outer edge of the stopper, and therefore these workpieces are less likely to come into close contact with each other. Therefore, according to the first aspect, it is possible to prevent a large friction force from acting between a workpiece to be taken out and the stopper, and also to prevent the workpiece from being caught on the stopper or its adjoining workpiece while being taken out. It is thus possible to take out the stopped workpieces one at a time in a reliable manner.

According to the second aspect of the present invention, the workpieces stopped by the stopper are likely to collect at the inside of the recessed part, and therefore it is possible to take out the workpieces in a reliable manner even if the range of operation of the takeout apparatus is relatively small.

According to the third aspect of the present invention, the robot hand is accurately positioned with respect to the individual workpieces, and therefore even if the workpieces stopped by the stopper are spread out over a wide range of the conveyance apparatus, it is possible to take out these workpieces one at a time in a reliable manner.

The present invention is not limited to the above-mentioned embodiments and can be modified in various ways within the scope described in the claims. For example, in the above embodiments, a belt conveyor was illustrated as the conveyance apparatus 1, but the conveyance apparatus 1 in the workpiece conveyor system S of the present invention may be any mechanical apparatus, such as a roller conveyor, which can convey a plurality of workpieces W in one direction. Further, in the above embodiments, a vertical articulated robot was illustrated as the takeout apparatus 3, but the takeout apparatus 3 in the workpiece conveyor system S of the present invention may be any mechanical apparatus, such as a horizontal articulated robot and orthogonal robot etc., which can take out workpieces W from the conveyance apparatus 1. Furthermore, the takeout apparatus 3 of the workpiece conveyor system S of the present invention may also have an electromagnetic type or servo drive type of robot hand RH, instead of the vacuum suction type of robot hand RH which was illustrated in the above embodiments.

The invention claimed is:

1. A workpiece conveyor system comprising:
 a conveyance apparatus which conveys workpieces in one direction,
 a stopper which extends across an entire width of the conveyance apparatus and is mounted on said conveyance apparatus so as to stop workpieces which are conveyed by said conveyance apparatus at a predetermined position such that a plurality of the stopped workpieces accumulate on the stopper at the predetermined position while the conveyance apparatus is moving, and
 a takeout apparatus which takes out workpieces one at a time from the plurality of workpieces which have been stopped and accumulated on said stopper at the predetermined position from said conveyance apparatus, wherein,
 an outer edge of said stopper in an opposite direction to a conveyance direction of workpieces by said conveyance apparatus extends in a curved shape in a transverse direction of said conveyance apparatus so as to collect the workpieces at the predetermined position,
 wherein the stopper remains fixed in place at the predetermined position while the plurality of the stopped workpieces accumulate on the stopper and the takeout apparatus removes the workpieces one at a time.

2. The workpiece conveyor system according to claim 1, wherein
 said outer edge of said stopper has a recessed part which is recessed in the same direction as said conveyance direction.

3. The workpiece conveyor system according to claim 1, further comprising a position sensor which detects positions of workpieces which have been stopped by said stopper, and
 said takeout apparatus is a vertical articulated robot comprising a hand which grips a workpiece, and an arm which moves said hand to a position where said hand can grip a workpiece based on results of detection of said position sensor.

* * * * *